(12) United States Patent  
Ray

(10) Patent No.: US 8,649,601 B1  
(45) Date of Patent: Feb. 11, 2014

(54) METHOD AND APPARATUS FOR VERIFYING ANSWER DOCUMENT IMAGES

(75) Inventor: Damon E. Ray, New Hope, MN (US)

(73) Assignee: Data Recognition Corporation, Maple Grove, MN (US)

( * ) Notice: Subject to any disclaimer, the term of this patent is extended or adjusted under 35 U.S.C. 154(b) by 1512 days.

(21) Appl. No.: 12/256,339

(22) Filed: Oct. 22, 2008

Related U.S. Application Data

(60) Provisional application No. 60/981,755, filed on Oct. 22, 2007.

(51) Int. Cl.  
*G06K 9/00* (2006.01)

(52) U.S. Cl.  
USPC ........... 382/181; 382/100; 382/138; 434/322; 434/350

(58) Field of Classification Search  
USPC ............ 382/100, 181, 138, 204, 254, 283  
See application file for complete search history.

(56) References Cited

U.S. PATENT DOCUMENTS

| | | | |
|---|---|---|---|
| 4,813,077 A | 3/1989 | Woods et al. | |
| 4,817,179 A | 3/1989 | Buck | |
| 4,827,330 A | 5/1989 | Walsh et al. | |
| 4,837,842 A | 6/1989 | Holt | |
| 4,967,354 A | 10/1990 | Buchanan | |
| 4,978,305 A | 12/1990 | Kraft | |
| 5,001,769 A | 3/1991 | Reid-Green et al. | |
| 5,004,896 A | 4/1991 | Serrell et al. | |
| 5,041,874 A * | 8/1991 | Nishimori et al. | 399/203 |
| 5,194,966 A | 3/1993 | Quardt et al. | |
| 5,313,291 A | 5/1994 | Appel et al. | |
| 5,321,611 A | 6/1994 | Clark et al. | |
| 5,363,318 A | 11/1994 | McCauley | |
| 5,433,615 A | 7/1995 | Clark | |
| 5,452,379 A | 9/1995 | Poor | |
| 5,557,515 A * | 9/1996 | Abbruzzese et al. | 705/7.15 |
| 5,672,060 A | 9/1997 | Poor | |
| 5,735,694 A | 4/1998 | Clark et al. | |
| 5,825,947 A | 10/1998 | Sasaki et al. | |
| 5,832,100 A | 11/1998 | Lawton et al. | |

(Continued)

FOREIGN PATENT DOCUMENTS

EP 0 374 892 B1 4/1997

OTHER PUBLICATIONS

""Score Image" Processing of Constructed-Responses, Essays, and Writing Samples", *UNISCORE, Incorporated*, (1992), 3 pgs.

(Continued)

*Primary Examiner* — Vu Le  
*Assistant Examiner* — Aklilu Woldemariam  
(74) *Attorney, Agent, or Firm* — Schwegman Lundberg & Woessner, P.A.

(57) ABSTRACT

Disclosed herein, among other things, are method and apparatus for verifying answer document images. According to one embodiment of a method, data collected from a scanned image of an answer document is received, the data including an indication of whether a bubble on the answer document is marked. Responses are automatically identified to have a first review, including sorting the collected data using one or more predetermined criteria. The responses are automatically forwarded to a first editor to conduct the first review, the first review including a data entry. If the data entry of the first editor varies with the indication for a particular response, the particular response is automatically forwarded to a second editor to conduct a second review, where the first editor is different from the second editor.

18 Claims, 8 Drawing Sheets

(56) References Cited

U.S. PATENT DOCUMENTS

| | | | |
|---|---|---|---|
| 5,907,742 A | 5/1999 | Johnson et al. | |
| 5,987,149 A | 11/1999 | Poor | |
| 5,987,302 A | 11/1999 | Driscoll et al. | |
| 6,141,120 A | 10/2000 | Falk | |
| 6,173,154 B1 | 1/2001 | Kucinski et al. | |
| 6,183,261 B1 | 2/2001 | Clark et al. | |
| 6,204,873 B1 | 3/2001 | Shimazaki | |
| 6,256,111 B1 | 7/2001 | Rijavec | |
| 6,321,052 B1 | 11/2001 | Yamashina et al. | |
| 6,366,759 B1 | 4/2002 | Burstein et al. | |
| 6,404,517 B1 | 6/2002 | Chao | |
| 6,459,509 B1 | 10/2002 | Maciey et al. | |
| 6,471,352 B2 | 10/2002 | Akahira | |
| 6,526,258 B2 | 2/2003 | Bejar et al. | |
| 6,532,026 B2 | 3/2003 | Takahashi et al. | |
| 6,645,029 B2 | 11/2003 | Akahira | |
| 6,714,321 B2 | 3/2004 | Rao et al. | |
| 6,832,825 B1 | 12/2004 | Nishikori et al. | |
| 6,947,571 B1 * | 9/2005 | Rhoads et al. | 382/100 |
| 7,027,187 B1 | 4/2006 | Zuber | |
| 7,084,998 B2 | 8/2006 | Blair et al. | |
| 7,162,198 B2 | 1/2007 | Kuntz et al. | |
| 7,295,340 B2 | 11/2007 | Mestha et al. | |
| 7,406,392 B2 * | 7/2008 | Gedlinske et al. | 702/108 |
| 7,411,688 B1 | 8/2008 | Zhai et al. | |
| 7,474,783 B2 | 1/2009 | Sharma et al. | |
| 7,505,173 B2 | 3/2009 | Viturro et al. | |
| 7,516,895 B2 | 4/2009 | Holoubek | |
| 7,573,616 B2 | 8/2009 | Poor | |
| 7,630,931 B1 | 12/2009 | Rachev et al. | |
| 7,692,832 B2 | 4/2010 | Klassen | |
| 7,697,166 B2 | 4/2010 | Bray | |
| 7,742,991 B2 * | 6/2010 | Salzmann et al. | 705/51 |
| 7,831,195 B2 * | 11/2010 | Borchers | 434/350 |
| 7,835,043 B2 | 11/2010 | Gila et al. | |
| 7,992,953 B2 | 8/2011 | Yorimoto et al. | |
| 8,102,412 B2 | 1/2012 | Klemer et al. | |
| 2001/0028916 A1 | 10/2001 | Akahira | |
| 2001/0040979 A1 | 11/2001 | Davidson et al. | |
| 2002/0054384 A1 | 5/2002 | Motamed | |
| 2002/0126172 A1 | 9/2002 | Akiyama | |
| 2002/0161772 A1 * | 10/2002 | Bergelson et al. | 707/100 |
| 2003/0016263 A1 | 1/2003 | Takahashi et al. | |
| 2003/0105721 A1 | 6/2003 | Ginter et al. | |
| 2003/0118976 A1 | 6/2003 | Makishima et al. | |
| 2003/0126001 A1 | 7/2003 | Northcutt et al. | |
| 2003/0202029 A1 | 10/2003 | Bronswijk et al. | |
| 2004/0114164 A1 | 6/2004 | Linder et al. | |
| 2004/0117617 A1 * | 6/2004 | Geller et al. | 713/156 |
| 2004/0130739 A1 | 7/2004 | Adam et al. | |
| 2004/0131279 A1 | 7/2004 | Poor | |
| 2004/0264771 A1 | 12/2004 | Sharma et al. | |
| 2005/0024410 A1 | 2/2005 | Subirada et al. | |
| 2005/0094170 A1 | 5/2005 | Ichitani | |
| 2005/0172226 A1 | 8/2005 | Kobashi et al. | |
| 2005/0206982 A1 | 9/2005 | Hattori | |
| 2005/0213790 A1 * | 9/2005 | Rhoads et al. | 382/100 |
| 2006/0028699 A1 | 2/2006 | Venable et al. | |
| 2006/0077407 A1 | 4/2006 | Tanaka | |
| 2006/0164700 A1 | 7/2006 | Hayashi | |
| 2006/0193017 A1 | 8/2006 | Zuber | |
| 2006/0195508 A1 | 8/2006 | Bernardin et al. | |
| 2006/0227386 A1 | 10/2006 | Nuuja et al. | |
| 2006/0285134 A1 | 12/2006 | Viturro et al. | |
| 2006/0288279 A1 | 12/2006 | Yacoub et al. | |
| 2007/0024657 A1 | 2/2007 | Zhang et al. | |
| 2007/0024928 A1 | 2/2007 | Ono | |
| 2007/0201112 A1 | 8/2007 | Motamed | |
| 2007/0247681 A1 | 10/2007 | Klassen | |
| 2008/0080027 A1 | 4/2008 | Mestha et al. | |
| 2008/0152371 A1 | 6/2008 | Burry et al. | |
| 2008/0225067 A1 | 9/2008 | Morino et al. | |
| 2008/0316552 A1 | 12/2008 | Poor | |
| 2009/0002724 A1 | 1/2009 | Paul et al. | |
| 2009/0059321 A1 | 3/2009 | Buckley | |
| 2009/0086230 A1 | 4/2009 | Reed | |
| 2010/0231728 A1 | 9/2010 | Holub | |
| 2010/0284041 A1 | 11/2010 | Warnes | |

OTHER PUBLICATIONS

"Image Processing of Open-Ended Questions", *UNISCORE, Incorporated*, (1992), 4 pgs.

Cason, Gerald J, et al., "Integrated Test Scoring, Performance Rating and Assessment Records Keeping", *Innovations in Medical Education, Association of American Medical Colleges*, Washington, D.C.., Paper presented at the annual meeting of the Association of Medical Colleges., (Nov. 1, 1987), 2-20.

Gathy, P, et al., "Computer-Assisted Self-Assessment (CASA) in Histology", *Computers Education.*, vol. 17, No. 2., (1991), 109-116.

Reid-Green, Keith S, "A High Speed Image Processing System [Journal Paper]", *IMC Journal*, vol. 26, No. 2, March-April, USA, (1990), 12-14.

Zuckerman, Ronald A, "Optical Scanning for Data Collection, Conversion & Reduction", *NTIS, U.S. Department of Commerce, National Technical Information Service*, August, Springfield, VA, USA, (1967), 49 pgs.

"U.S. Appl. No. 12/256,282, Advisory Action mailed Dec. 31, 2012", 3 pgs.

"U.S. Appl. No. 12/256,282, Non Final Office Action mailed Mar. 28, 2013", 12 pgs.

"U.S. Appl. No. 12/256,282, Response filed Dec. 6, 2012 to Final Office Action mailed Aug. 6, 2012", 7 pgs.

"U.S. Appl. No. 12/256,317, Notice of Allowance mailed Mar. 19, 2013", 9 pgs.

"U.S. Appl. No. 12/256,354, Corrected Notice of Allowance mailed Jan. 17, 2013", 2 pgs.

"U.S. Appl. No. 12/256,354, Notice of Allowance mailed Feb. 1, 2013", 5 pgs.

"U.S. Appl. No. 12/256,354, Response filed Dec. 21, 2011 to Restriction Requirement mailed Nov. 21, 2011", 5 pgs.

"U.S. Appl. No. 12/256,282, Non Final Office Action mailed Jan. 4, 2012", 12 pgs.

"U.S. Appl. No. 12/256,282, Response filed Apr. 4, 2012 to Non Final Office Action mailed Jan. 4, 2012", 7 pgs.

"U.S. Appl. No. 12/256,303, Non Final Office Action Mailed Jan. 5, 2012", 9 pgs.

"U.S. Appl. No. 12/256,303, Response filed Apr. 5, 2012 to Non Final Office Action mailed Jan. 5, 2012", 8 pgs.

"U.S. Appl. No. 12/256,303, Response filed Oct. 24, 2011 to Restriction Requirement mailed Jul. 23, 2011", 6 pgs.

"U.S. Appl. No. 12/256,303, Restriction Requirement mailed Aug. 23, 2011", 5 pgs.

"U.S. Appl. No. 12/256,317 , Response filed Feb. 7, 2012 to Non Final Office Action mailed Oct. 7, 2011", 8 pgs.

"U.S. Appl. No. 12/256,317, Non Final Office Action mailed Oct. 7, 2011", 10 pgs.

"U.S. Appl. No. 12/256,317, Notice of Allowance mailed Mar. 2, 2012", 11 pgs.

"U.S. Appl. No. 12/256,354, Non Final Office Action maied Mar. 1, 2012", 8 pgs.

"U.S. Appl. No. 12/256,354, Restriction Requirement mailed Nov. 21, 2011", 8 pgs.

"U.S. Appl. No. 12/256,282, Final Office Action mailed Aug. 6, 2012", 13 pgs.

"U.S. Appl. No. 12/256,303, Final Office Action mailed May 29, 2012", 15 pgs.

"U.S. Appl. No. 12/256,303, Response filed Oct. 22, 2012 to Final Office Action mailed May 29, 2012", 10 pgs.

"U.S. Appl. No. 12/256,317, Notice of Allowance mailed Nov. 7, 2012", 9 pgs.

"U.S. Appl. No. 12/256,354, Notice of Allowance mailed Oct. 5, 2012", 7 pgs.

"U.S. Appl. No. 12/256,354, Response filed Aug. 1, 2012 to Non Final Office Action mailed Mar. 1, 2012", 7 pgs.

* cited by examiner

METHOD AND APPARATUS FOR VERIFYING ANSWER DOCUMENT IMAGES

CROSS-REFERENCE TO RELATED APPLICATIONS

This application claims the benefit of provisional U.S. patent application Ser. No. 60/981,755, filed on Oct. 22, 2007, which is hereby incorporated by reference in its entirety.

TECHNICAL FIELD

This disclosure relates generally to objective testing and surveys, and more particularly to method and apparatus for verifying test result or survey images.

BACKGROUND

One method for evaluating the knowledge or skill of a person includes the use of standardized tests. For example, standardized tests are used to monitor the academic progress of students. Some standardized tests incorporate objective test questions that are answered by filling in an appropriate oval in an associated bubble-type answer sheet using a pencil.

Another practice by which information is obtained is a survey. Surveys are used to obtain information from a person, such as a consumer of goods or services. Surveys also use forms having standardized questions. Large amounts of data can be compiled from surveys using standardized forms. Thus, there is a need for accurate collection of data from the standardized forms.

In order to promote the integrity and accuracy of the administered tests and surveys, it is desirable to properly identify how a test or survey-taker answered a particular question, such as to give proper credit to each student and prevent inaccuracies in providing test results.

Improved method and apparatus for verifying objective test result and survey images are needed.

SUMMARY

The above-mentioned problems and others not expressly discussed herein are addressed by the present subject matter and will be understood by reading and studying this specification.

Disclosed herein, among other things, are method and apparatus for verifying answer document images. According to one embodiment of a method, data collected from a scanned image of an answer document is received, the data including an indication of whether a bubble on the answer document is marked. Responses are automatically identified to have a first review, including sorting the collected data using one or more predetermined criteria. The responses are automatically forwarded to a first editor to conduct the first review, the first review including a data entry. If the data entry of the first editor varies with the indication for a particular response, the particular response is automatically forwarded to a second editor to conduct a second review, where the first editor is different from the second editor.

Another aspect of this disclosure includes a method for verifying test result images. According to one embodiment of the method, data collected from a scanned image of an examination answer sheet is received, the data including an indication of whether a bubble on the answer sheet is marked. Responses are automatically identified to have a first review, including sorting the collected data using one or more predetermined criteria. The responses are automatically forwarded to a first editor to conduct the first review. The responses are automatically forwarded to a second editor to conduct a second review, where the first editor is different from the second editor.

Another aspect of this disclosure includes a system for verifying answer document images. According to one embodiment, the system includes a computer database adapted to receive data collected from a scanned image of an answer document, the data including an indication of whether a bubble on the answer document is marked. A computer processor is connected to the database, the processor adapted to automatically identify responses to have a first review, including sorting the collected data using one or more predetermined criteria. A data transmitting module connected to the processor and is adapted to automatically forward the responses to a first editor to conduct a first review, and further adapted to automatically forward the particular response to a second editor to conduct a second review, where the first editor is different from the second editor.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
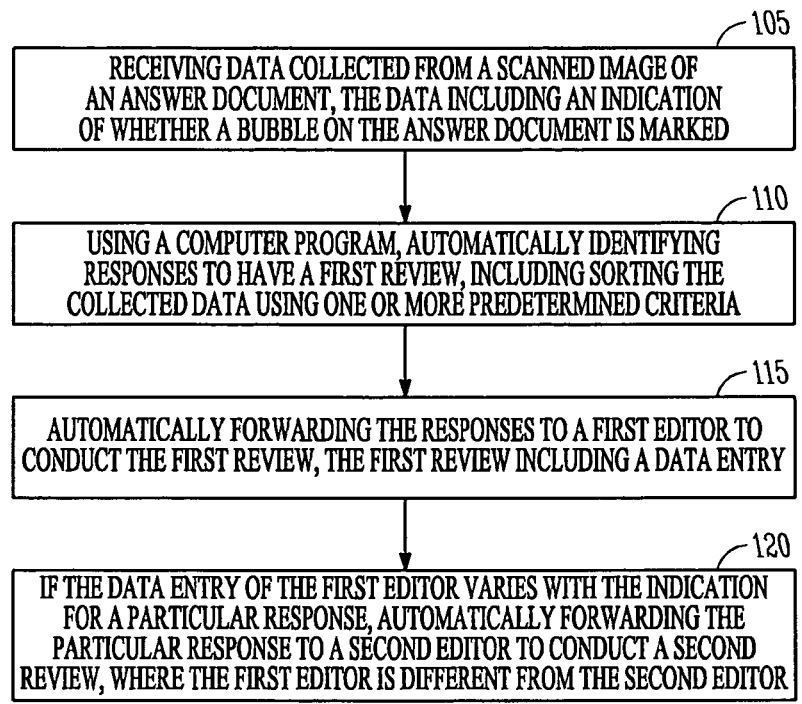
FIG. 1 illustrates a flow diagram of an embodiment of a method for verifying answer document images.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter generally relates to methods and apparatus for verifying answer document images. Answer documents include, but are not limited to: education assessments such as test results or test answer sheets; and survey form images. A computer application for verifying and editing responses where there is some question of the intended answer is referred to as quality control editing (or QC editing). Examples of situations in which there is some question of the intended answer on a test answer sheet include, but are not limited to: if more than one bubble scans as marked (i.e., it appears as if the student selected more than one answer), if no bubbles scan as marked (it appears as if the student selected no answers), or if erasures or marks exist which bring the result into question. In these situations, occurrences are selected where more than one editor is shown the response to determine if the machine correctly scored the response. If responses are the same, then they are accepted by the system. The system presents the editors with the response via an on-line system, eliminating the need for the editor to have the physical document. The system has built-in security, so if an individual edited the batch originally, they are locked out from being the QC editor (second pair of eyes) for that batch. This adds an extra level of control for document review. Also, the system allows for tracking the identification of which person or machine performed each step, or was responsible for each instance of scanning, scoring or editing. A time stamp and/or date stamp for each instance of scanning, scoring or editing is also generated and stored.

According to various embodiments, bubbles refer to any two-dimensionally closed form adapted to be filled in with a writing utensil, such as but not limited to: a circle, an ellipse, a square, and a rectangle. Bubbles with other shapes and sizes can be used without departing from the scope of this disclosure.

An image operations system purpose is to convert educational assessments (or completed survey forms) from paper format to electronic format. Scanners capture images of gridded or bubbled items that are responded to by filling in a bubble on a document page. Downstream image operations score or read all "bubbled" data. Bubble target reads or scores may require human interpretation to ensure scanners have read targets accurately. Specific instances to be reviewed or edited by an editor include: presence of multiple marks, bubbled omissions and blanks on defined items. The editing applications provide a user interface to review and/or correct captured bubble response data based on the edit rules established in the image field definition application. In addition to an initial review of bubbled responses, a double-key or quality assurance editing capability is included as an editing function. The double editing if input data provides an additional quality check of priority fields, as well as any bubble read that changed from its initial scanned value. In addition, gridded data inserted via flatbed scanned images will be keyed and verified in the editing applications.

FIG. 1 illustrates a flow diagram of an embodiment of a method for verifying objective test result images. According to one embodiment of the method, data collected from a scanned image of an answer document is received, at 105, the data including an indication of whether a bubble on the answer document is marked. Using a computer program, responses are automatically identified to have a first review, including sorting the collected data using one or more predetermined criteria, at 110. Automatically identifying the responses includes using a computer program to identify the responses, in various embodiments. The responses are automatically forwarded to a first editor to conduct the first review, the first review including a data entry, at 115. If the data entry of the first editor varies with the indication for a particular response, the particular response is automatically forwarded to a second editor to conduct a second review, at 120, where the first editor is different from the second editor.

According to various embodiments, the data is tracked and access to the data is controlled to prevent a single editor from acting as both the first editor and the second editor. One example of controlling access includes providing individual, distinct passwords for each individual editor. Another example includes granting access based on authority level, where the first and second editors have different levels of authority. Identifying responses includes determining whether more than one bubble is filled for a single question, in an embodiment. In various embodiments, identifying responses includes determining whether no bubbles are filled for a single question. Identifying responses includes determining whether no initial scanner value can be determined for a single question, and/or determining whether erasures or marks exist that bring into question whether a bubble is filled, in various embodiments. Tracking the data includes applying a time and/or date stamp for each instance of editing, scanning and/or scoring the data, in various embodiments. In an embodiment, if reference marks cannot be location on an answer document, the entire document is forwarded for a first review.

Demographic fields of an answer document include fields where the respondent provides information about their name, age, address, grade level and subject, for example. In demographic fields, it is common for more than one bubble to be filled in (where a name is more then one letter, for example). In the case of demographic fields, it is necessary to search for omitted bubbles (or "omits"). Examples of omitted bubbles include leading bubbles, trailing bubbles and embedded bubbles. Leading bubble omits include omitted bubbles at the beginning of a series of filled bubbles. Trailing bubble omits include omitted bubbles at the end of a series of filled bubbles. Embedded bubble omits include omitted bubbles within a series of filled bubbles.

The quality control editing process is automated and provides a blind edit to the second editor, in an embodiment. The first editor is presented with the bubbles and the value given by the scanner, and the second editor is also presented with the bubbles and the value given by the scanner, but not the value given by the first editor, in an embodiment. According to various embodiments, three manual settings exist for quality control editing rules. The second edit is required: 1) always if field flagged for an initial edit; 2) never; or 3) only if the initial edit made a change (default setting). The system forces the initial edit, and will not advance through processing until completed.

Another aspect of this disclosure includes a method for automatically verifying test result images. Certain images are indicated to always have a review by a second editor. An example would be a student identification number grid, where the accuracy of the bubbles is of highest priority (for associating a student with her results). According to one embodiment of the method, data collected from a scanned image of an examination answer sheet is received, the data including an indication of whether a bubble on the answer sheet is marked. Using a computer program, responses are automatically identified to have a first review, including sorting the collected data using one or more predetermined criteria. The responses are automatically forwarded to a first editor to conduct the first review. The responses are automatically forwarded to a second editor to conduct a second review, where the first editor is different from the second editor. Identifying responses includes determining whether more than one bubble is filled for a single question, in an embodiment. In various embodiments, identifying includes determining whether no bubbles are filled for a single question.

Another aspect of this disclosure includes a system for verifying answer document images. According to one embodiment, the system includes a computer database adapted to receive data collected from a scanned image of an answer document, the data including an indication of whether a bubble on the answer document is marked. A computer processor is connected to the database, the processor adapted to automatically identify responses to have a first review, including sorting the collected data using one or more predetermined criteria. A data transmitting module connected to the processor and is adapted to automatically forward the responses to a first editor to conduct a first review, and further adapted to automatically forward the particular response to a second editor to conduct a second review, where the first editor is different from the second editor. According to various embodiments, the answer document includes an examination answer sheet. The answer document includes a completed survey form, in an embodiment. In various system embodiments, the data transmitting module includes a computer having a display. A server-based computer system is used, in various embodiments. Other types of computers, such as desktops, laptops, and personal data assistants can be used without departing from the scope of the disclosure.

Figure 2A:
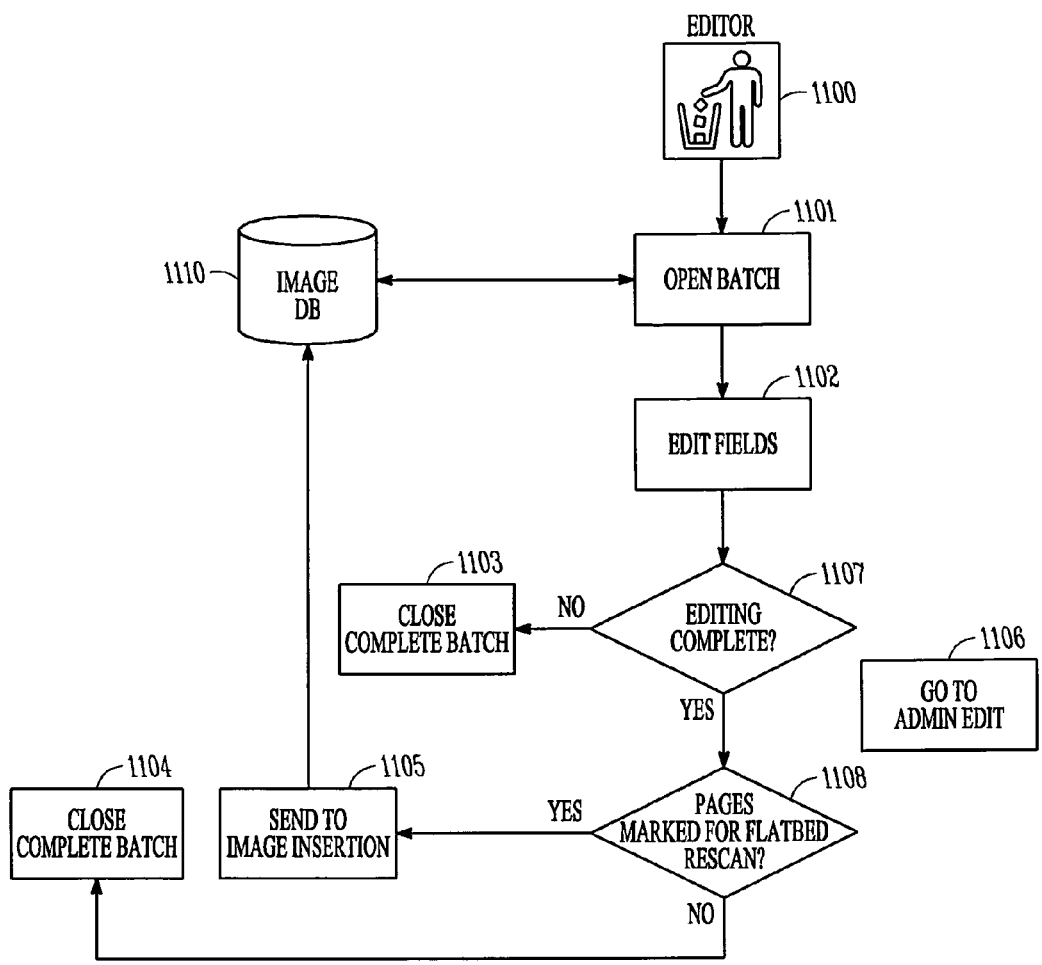
FIG. 2A illustrates a data flow diagram of a method for editing objective test result images, in an embodiment.

FIG. 2A illustrates a data flow diagram of a method for editing objective test result images, in an embodiment. At 1101, editor 1100 opens a batch of scanned documents to edit from the imaging database 1110. At 1102, the editor edits fields as necessary, and if the editing not is complete at 1107, the incomplete batch is closed at 1103. If the editing is complete, a check is made at 1108 to see if the pages are marked for rescan on a flatbed scanner. If so, the pages are sent to an image insertion module at 1105 to be rescanned and entered into the image database 1110. If not, the completed batch is closed at 1104. An administrative edit 1106, such as that depicted in FIG. 2C, can be invoked at any point within the editing, assuming a user has the appropriate permission.

Figure 2B:
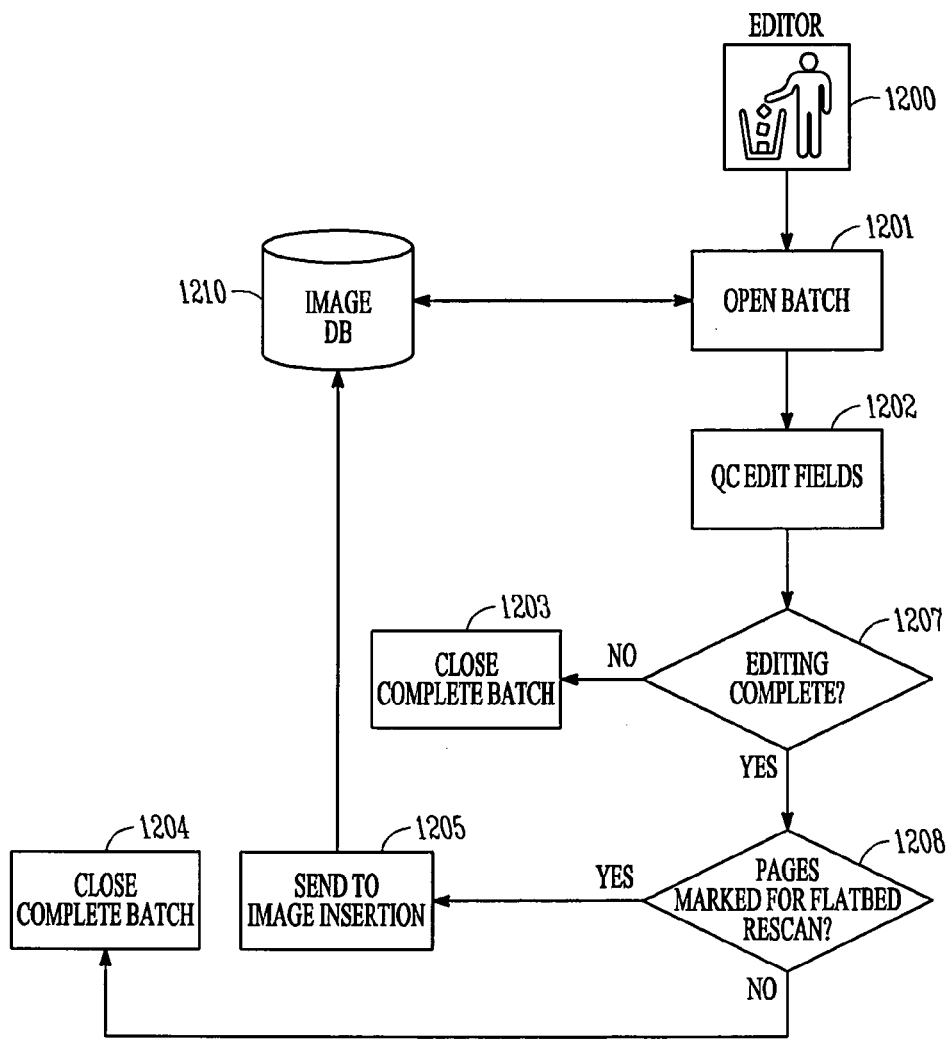
FIG. 2B illustrates a data flow diagram of a method for quality control editing of answer document images, in an embodiment.

FIG. 2B illustrates a data flow diagram of a method for quality control editing of objective test result images, in an embodiment. At 1201, quality control (QC) editor 1200 opens a batch of scanned documents to perform a quality control edit from the imaging database 1210. At 1202, the QC editor edits fields as necessary, and if the editing not is complete at 1207, the incomplete batch is closed at 1203. If the editing is complete, a check is made at 1208 to see if the pages are marked for rescan on a flatbed scanner. If so, the pages are sent to an image insertion module at 1205 to be rescanned and entered into the image database 1210. If not, the completed batch is closed at 1204.

Figure 2C:
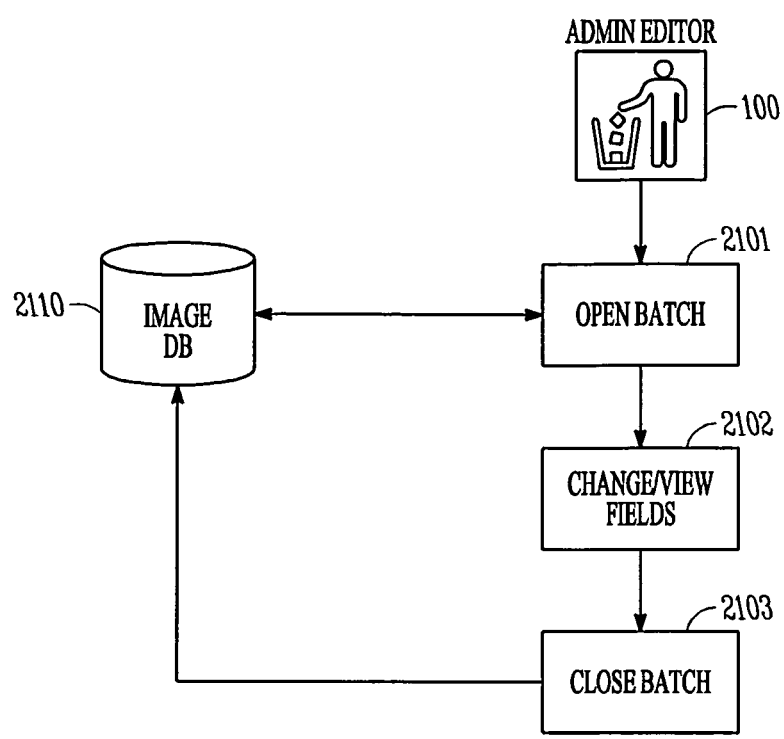
FIG. 2C illustrates a data flow diagram of a method for administrative editing of answer document images, in an embodiment.

FIG. 2C illustrates a data flow diagram of a method for administrative editing of objective test result images, in an embodiment. At 2101, administrative editor 2100 opens a batch of scanned documents from the imaging database 2110 to perform an administrative edit. The opening process takes place through the editing application. At 2102, the administrative editor changes and/or views fields in the batch of documents, and then closes the batch when complete, at 2103, returning the batch to the imaging database 2110.

Figure 5A:
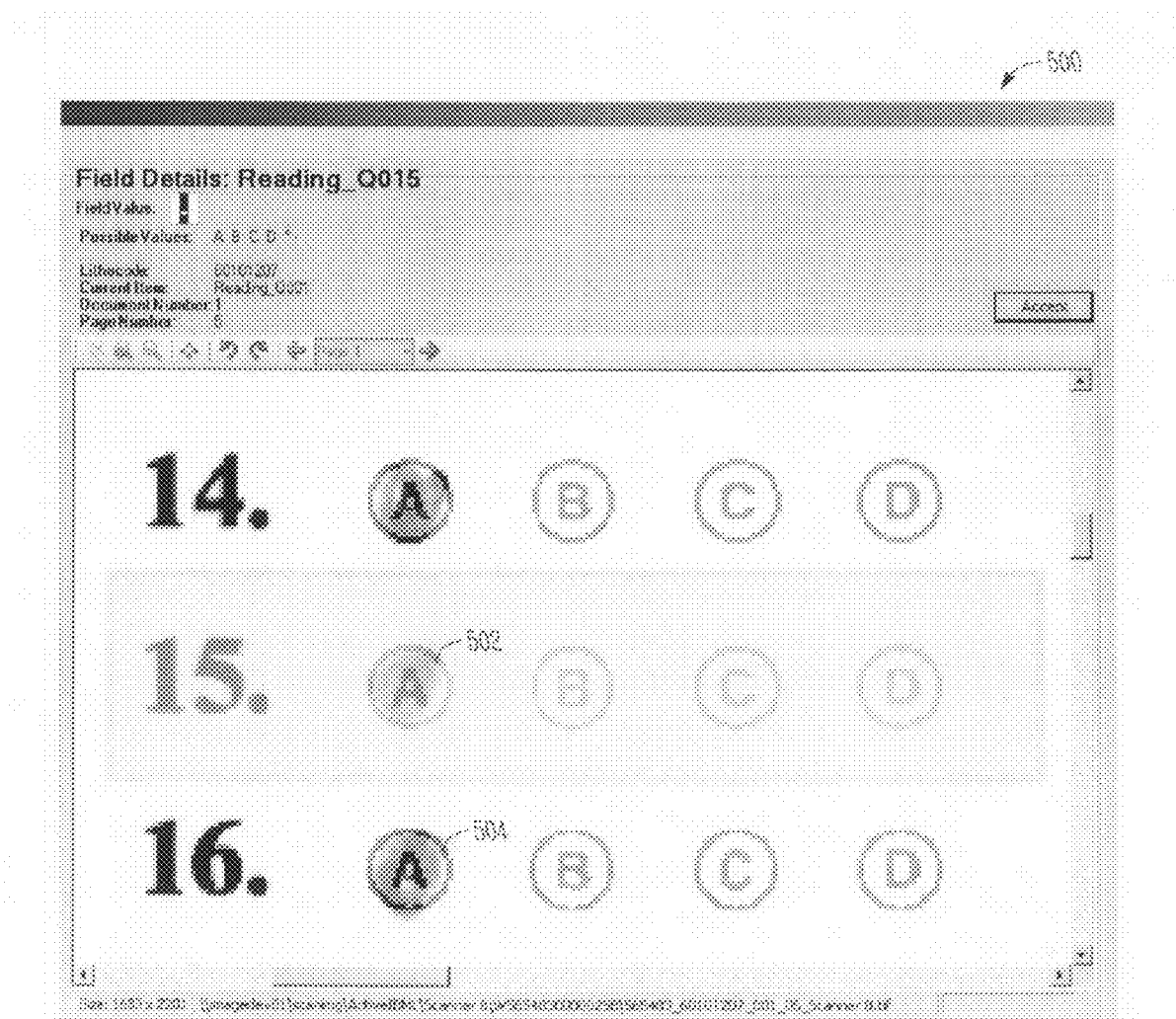
FIGS. 5A-5B illustrate screen images as displayed to an editor, in an embodiment.
Figure 5B:
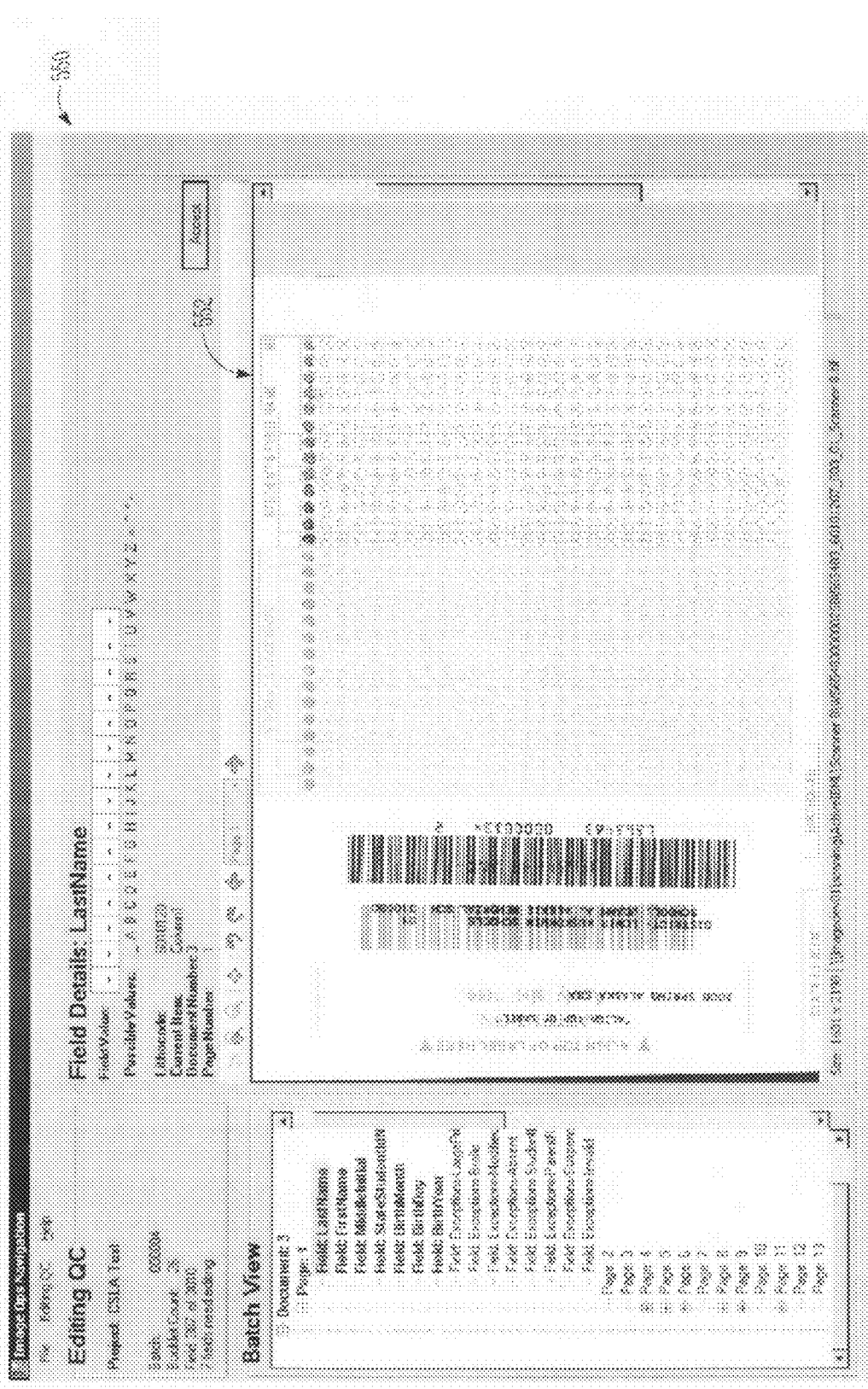

FIGS. 5A-5B illustrate screen images as displayed to an editor, in an embodiment. FIG. 5A depicts a screen image 500 presented to a quality control editor for interpretation of whether particular bubbles should be read as marked or unmarked. For example, bubble 502 illustrates a bubble that was shaded too lightly to register as marked on the initial scan, and bubble 504 illustrates a bubble that has marks outside the circle that can affect whether the bubble will register as marked on the scan. FIG. 5B depicts a screen image 550 to presented to a quality control editor. Several fields allow the editor to give values to provide her interpretation of whether the bubbles in question 552 are marked or unmarked.

Figure 3:
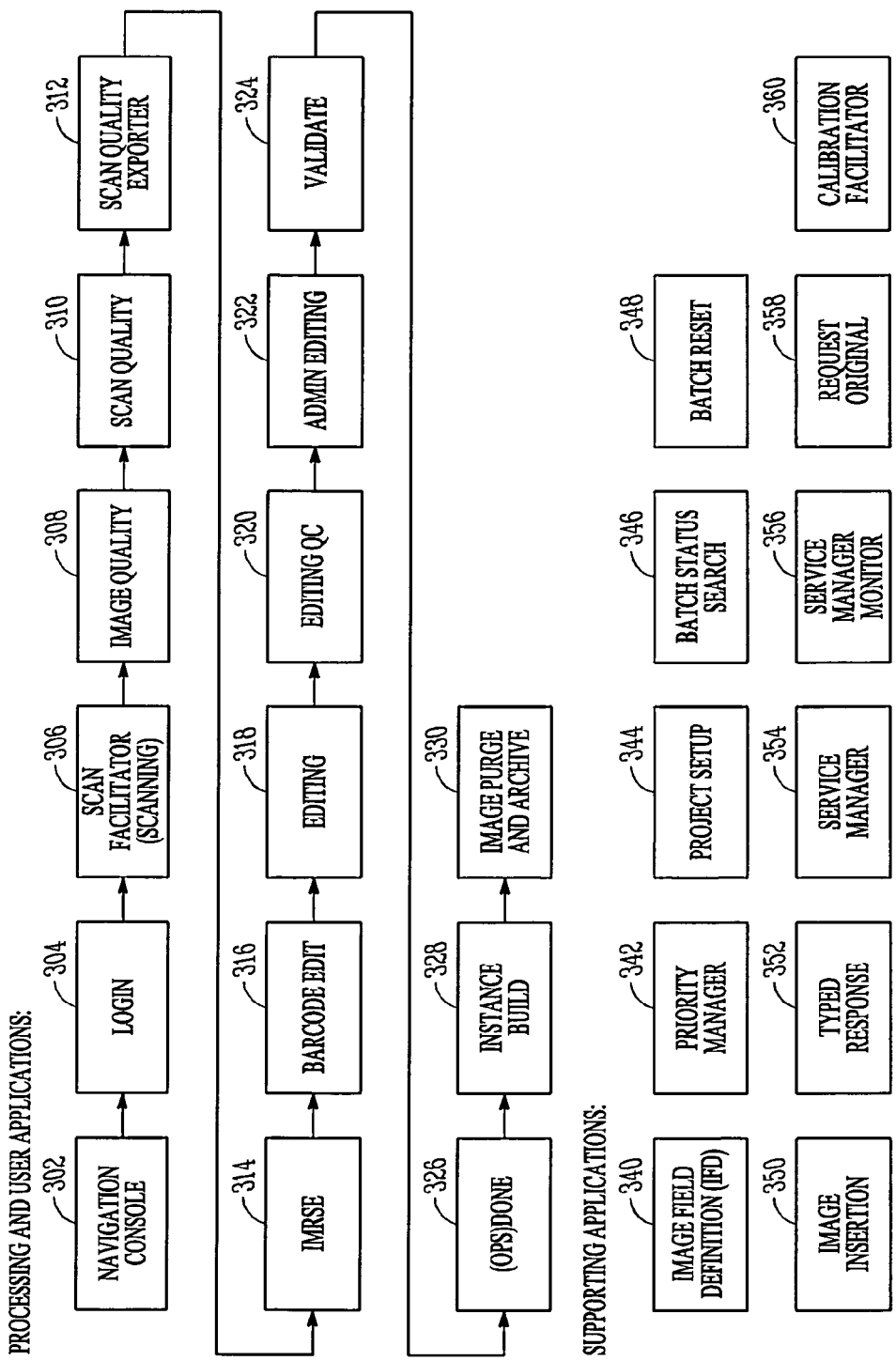
FIG. 3 illustrates a block diagram of an embodiment of an apparatus for imaging documents.

FIG. 3 illustrates a block diagram of an embodiment of an apparatus for imaging documents. Processing and user applications in the depicted embodiment include applications for: navigation console 302, login 304, scan facilitator 306, image quality 308, scan quality 310, scan quality exporter 312, image mark scoring recognition engine (IMRSE) 314, barcode edit 316, editing 318, editing quality control (QC) 320, administrative editing 322, validate 324, operations (OPS) done 326, instance build 328, and image purge and archive 330. Supporting applications include: image field definition (IFD) 340, priority manager 342, project setup 344, batch status search 346, batch reset 348, image insertion 350, typed response 352, service manager 354, service manager monitor 356, request original 358 and calibration facilitator 360.

Figure 4:
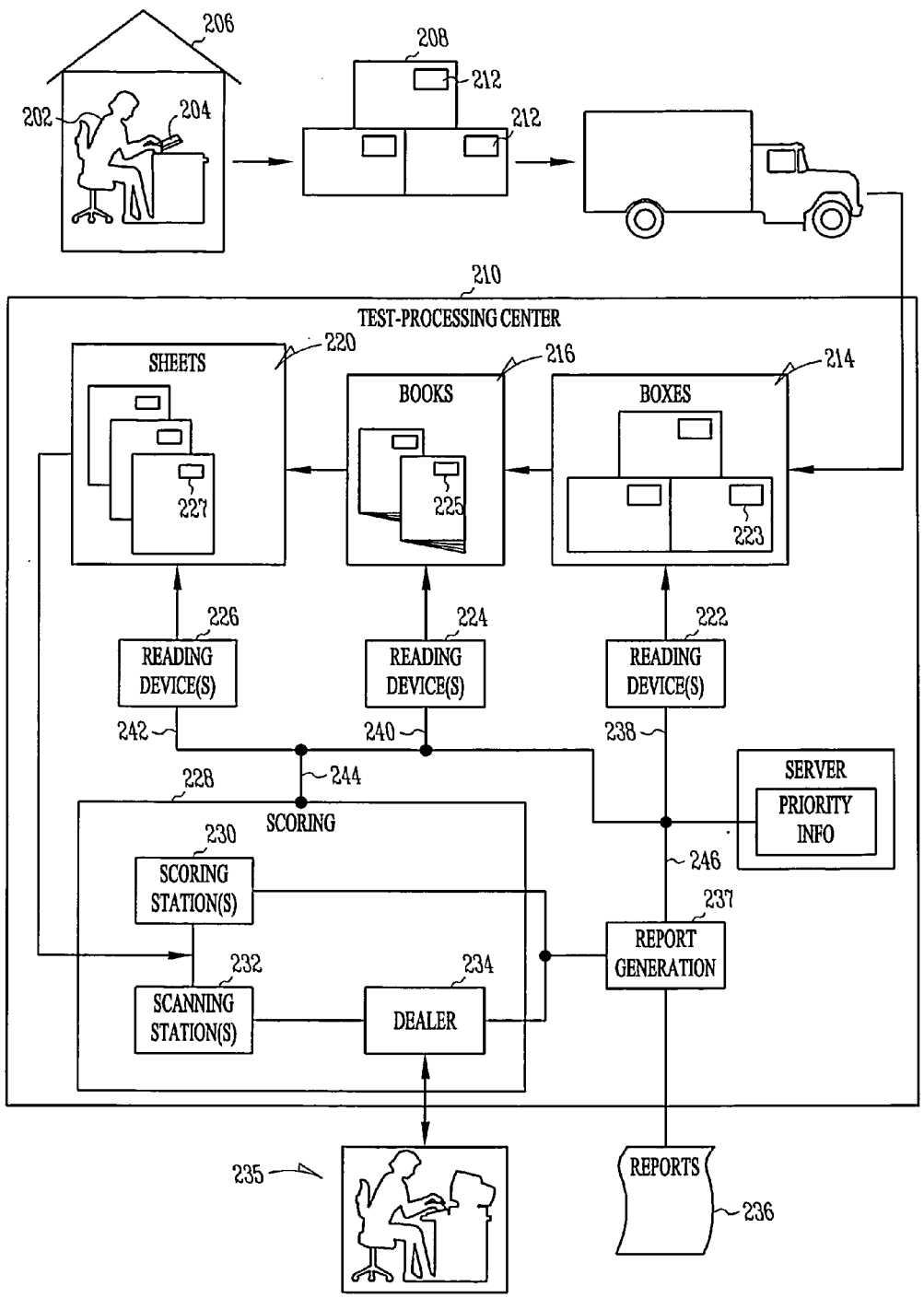
FIG. 4 illustrates a block diagram of an embodiment of an apparatus for processing and scanning documents.

FIG. 4 illustrates a block diagram of an embodiment of an apparatus for processing and scanning documents. The system resides outside the scanning system, and is a setup application used to tell the scanning system how to scan pages of a completed test. In the illustrated embodiment, a test-taker (e.g., a student) 202 completes a standardized test 204 at a test-taking center (e.g., a school) 206. In this embodiment, the standardized tests include test booklets. Each test booklet includes a number of pages that contain a number of test items or questions.

Completed test booklets are boxed, illustrated at 208, for shipping to a test-processing center 210. The boxes include an identifier 212, such as a bar code for example. Upon arriving at the test-processing center 210, the boxes of test booklets are unloaded at 214. The test booklets are removed from the boxes and sorted at 216. At 220, the test booklets are cut into loose pages. These loose pages are reconciled to ensure that all of the pages for each test booklet are accounted for. Reading devices 222, 224, and 226, such as bar code scanners for example, are used to read the identifiers 223 and identify the boxes, read the identifiers 225 and identify the test booklets, and read the identifiers and identify the pages. In one embodiment, the image field definition system identifies the identifying markings for the pages.

The test pages are graded or scored at 228. In one embodiment, objective scoring tasks, such as multiple choice questions for example, are scored using scoring of tests from images 230. In one embodiment, open-ended scoring tasks are scanned at scanning stations 232, are stored in a queue, and are distributed by a dealer 234 to human readers 235 who evaluate the open-ended scoring tasks. Reports 236 of the score results are provided at 237.

A server in the test-processing center is used to perform a variety of tasks with the scanned data, as discussed herein. In one embodiment, the server includes priority information, as illustrated via lines 238, 240, 242, 244 and 246; the priority information is available at various places along the process. In one embodiment, for example, the reading device(s) 222 determines which of the boxes should proceed for further processing before other boxes. In one embodiment, the reading device(s) 224 determine which of the test booklets should proceed for further processing before other test booklets. In one embodiment, the reading device(s) 226 determine which of the pages (or test items on the pages) should proceed for further processing before other pages (or test items on the pages). In one embodiment, for example, the priority information is used in the scoring system 228 to determine which test items should be scored before other test items. In one embodiment, for example, the priority information is used to determine which reports should be provided before other reports 236.

Specific embodiments have been illustrated and described herein, however, is to be understood that the above description is intended to be illustrative, and not restrictive. The scope of the present subject matter should be determined with reference to the appended claims, along with the full scope of legal equivalents to which such claims are entitled.

I claim:

1. A computer program implemented method, when executed by a computer comprising:
   receiving data collected from a scanned image of an answer document, said collected data including an indication of whether a bubble on the answer document is marked;
   sorting said collected data;
   automatically identifying scanned response for a first review, including said collected data, wherein said identifying includes determining whether more than one bubble is filled for a single question;
   automatically forwarding said scanned responses to a first human editor to conduct said first review, wherein said first review resulted in a data entry issued from said first editor, wherein said data entry includes an interpretation by said first editor of whether the bubble on the answer document is marked;
   if said data entry from said first editor differs with the indication for a particular scanned response, automatically forwarding the particular scanned response to a second human editor to conduct a second review, wherein said first editor is different from said the second editor;
   tracking said collected data and controlling to said collected data to prevent said first editor or said second editor from acting as both said first editor and said second editor.

2. The method of claim 1, comprising: tracking the data and controlling access to the data to prevent a single editor from acting as both the first editor and the second editor.

3. The method of claim 1, wherein the identifying includes determining whether no bubbles are filled for a single question.

4. The method of claim 1, wherein the identifying includes determining whether no initial scanner value can be determined for a single question.

5. The method of claim 4, wherein the identifying includes determining whether erasures exist that bring into question whether a bubble is filled.

6. The method of claim 2, wherein tracking the data includes applying a time stamp for each instance of editing the data.

7. The method of claim 2, wherein tracking the data includes applying a date stamp for each instance of editing the data.

8. The method of claim 1, wherein the identifying includes determining whether a bubble in a demographic field has been omitted.

9. The method of claim 8, wherein the identifying includes determining whether a leading bubble in a demographic field has been omitted.

10. The method of claim 8, wherein the identifying includes determining whether a trailing bubble in a demographic field has been omitted.

11. The method of claim 8, wherein the identifying includes determining whether an embedded bubble in a demographic field has been omitted.

12. A computer program implemented method, comprising:
    receiving data collected from a scanned image of an examination answer sheet, said data including an indication of whether a bubble on the answer sheet is marked;
    sorting said collected data;
    automatically identifying scanned responses for a first review, wherein said identifying includes determining whether no bubbles are filled for a single question;
    automatically forwarding said scanned responses to a first human editor to conduct said first review, wherein said first review resulted in a data entry issued from said first editor, wherein said data entry includes an interpretation by said first editor of whether the bubble on the answer document is marked;
    automatically forwarding said scanned responses to a second human editor to conduct a second review, wherein said first editor is different from said second editor;
    and tracking said collected data and controlling access to said collected data to prevent said first editor or said second editor from acting as both said first editor and said second editor.

13. The method of claim 12, wherein the identifying includes determining whether more than one bubble is filled for a single question.

14. The method of claim 12, comprising: tracking the data and controlling access to the data to prevent a single editor from acting as both the first editor and the second editor.

15. A system, comprising:
    a computer database receiving data collected from a scanned image of an answer document, said collected data including an indication of whether a bubble on the answer document is marked;
    a computer processor connected to said database, said computer processor sorts said collected data, automatically identifies scanned response for a first review, wherein said computer processor determines whether more than one bubble is filled for a single question or whether no bubbles are filled for a single question to identify the scanned response for review;
    and a data transmitting module connected to said computer processor, said data transmitting module automatically forwards said scanned responses to a first human editor to conduct said first review resulting in a data entry issued from said first editor, and automatically forwards said scanned responses to a second human editor to conduct a second review, wherein said first editor is different from said second editor, and wherein said system tracks said collected data and controls access to said collected data to prevent said first editor or said second editor from acting as both said first editor and said second editor.

16. The system of claim 15, wherein the answer document includes an examination answer sheet.

17. The system of claim 15, wherein the answer document includes a completed survey form.

18. The system of claim 15, wherein the data transmitting module includes a personal computer having a display.

* * * * *

UNITED STATES PATENT AND TRADEMARK OFFICE
CERTIFICATE OF CORRECTION

| | | |
|---|---|---|
| PATENT NO. | : 8,649,601 B1 | Page 1 of 1 |
| APPLICATION NO. | : 12/256339 | |
| DATED | : February 11, 2014 | |
| INVENTOR(S) | : Damon E. Ray | |

It is certified that error appears in the above-identified patent and that said Letters Patent is hereby corrected as shown below:

In the Claims

In column 7, line 32, in Claim 1, after "editor;", insert --and--, therefor

In column 8, line 21, in Claim 12, after "editor;", insert --and--, therefor

In column 8, line 22, in Claim 12, before "tracking", delete "and", therefor

In column 8, line 43, in Claim 15, after "review;", insert --and--, therefor

In column 8, line 44, in Claim 15, before "a data", delete "and", therefor

Signed and Sealed this
Eighteenth Day of November, 2014

Michelle K. Lee
*Deputy Director of the United States Patent and Trademark Office*